(12) United States Patent
McCarthy

(10) Patent No.: US 8,713,297 B2
(45) Date of Patent: Apr. 29, 2014

(54) DECREMENTING SETTINGS FOR A RANGE OF POWER CAPS WHEN A POWER CAP IS EXCEEDED

(75) Inventor: Clifford A. McCarthy, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

(21) Appl. No.: 13/258,384

(22) PCT Filed: Dec. 1, 2009

(86) PCT No.: PCT/US2009/066287
§ 371 (c)(1),
(2), (4) Date: Sep. 21, 2011

(87) PCT Pub. No.: WO2011/068504
PCT Pub. Date: Jun. 9, 2011

(65) Prior Publication Data
US 2012/0096248 A1  Apr. 19, 2012

(51) Int. Cl.
*G06F 1/26* (2006.01)
*G06F 9/00* (2006.01)

(52) U.S. Cl.
CPC .... *G06F 1/26* (2013.01); *G06F 9/00* (2013.01)
USPC ............................................. 713/1; 713/300

(58) Field of Classification Search
CPC ..................................... G06F 1/26; G06F 9/00
USPC ....................................................... 713/1, 300
See application file for complete search history.

(56) References Cited

U.S. PATENT DOCUMENTS

| 5,721,937 | A | 2/1998 | Kunihara et al. | |
|---|---|---|---|---|
| 2007/0050646 | A1* | 3/2007 | Conroy et al. | 713/300 |
| 2007/0245161 | A1 | 10/2007 | Shaw et al. | |
| 2009/0119523 | A1 | 5/2009 | Totten | |
| 2009/0125737 | A1 | 5/2009 | Brey et al. | |
| 2009/0265564 | A1 | 10/2009 | Clemo et al. | |
| 2010/0070787 | A1* | 3/2010 | Bieswanger et al. | 713/322 |

* cited by examiner

*Primary Examiner* — Thomas Lee
*Assistant Examiner* — Danny Chan

(57) ABSTRACT

When the maximum power consumption of a computer exceeds a currently selected power-consumption cap, a cap setting corresponding to the currently selected power-consumption cap is reduced. In addition, power-cap settings corresponding to power-consumption caps between said currently selected power-consumption cap and said maximum power consumption are reduced.

15 Claims, 2 Drawing Sheets

DECREMENTING SETTINGS FOR A RANGE OF POWER CAPS WHEN A POWER CAP IS EXCEEDED

BACKGROUND

Herein, related art is presented for expository purposes. Related art labeled "prior art", if any, is admitted prior art; related art not labeled prior art is not admitted prior art.

Capping power consumption by a computer system can serve a variety of purposes including conservation, budgetary constraints, heat buildup, interruption due to tripping a circuit breaker, and stress on a power-delivery infrastructure. Power consumption can be limited, for example, by disabling or throttling components (e.g., reducing processor clock rates). Accordingly, some computer systems provide a controller that allows a power consumption cap to be set to limit power consumption by the system.

However, there are circumstances in which a computer might exceed its power-consumption cap. For example, a cap below the minimum power consumption under which a computer system can operate will not be met. Accordingly, some controllers provide for adjusting a minimum settable power consumption so that such overages do not occur.

DETAILED DESCRIPTION

Figure 1:
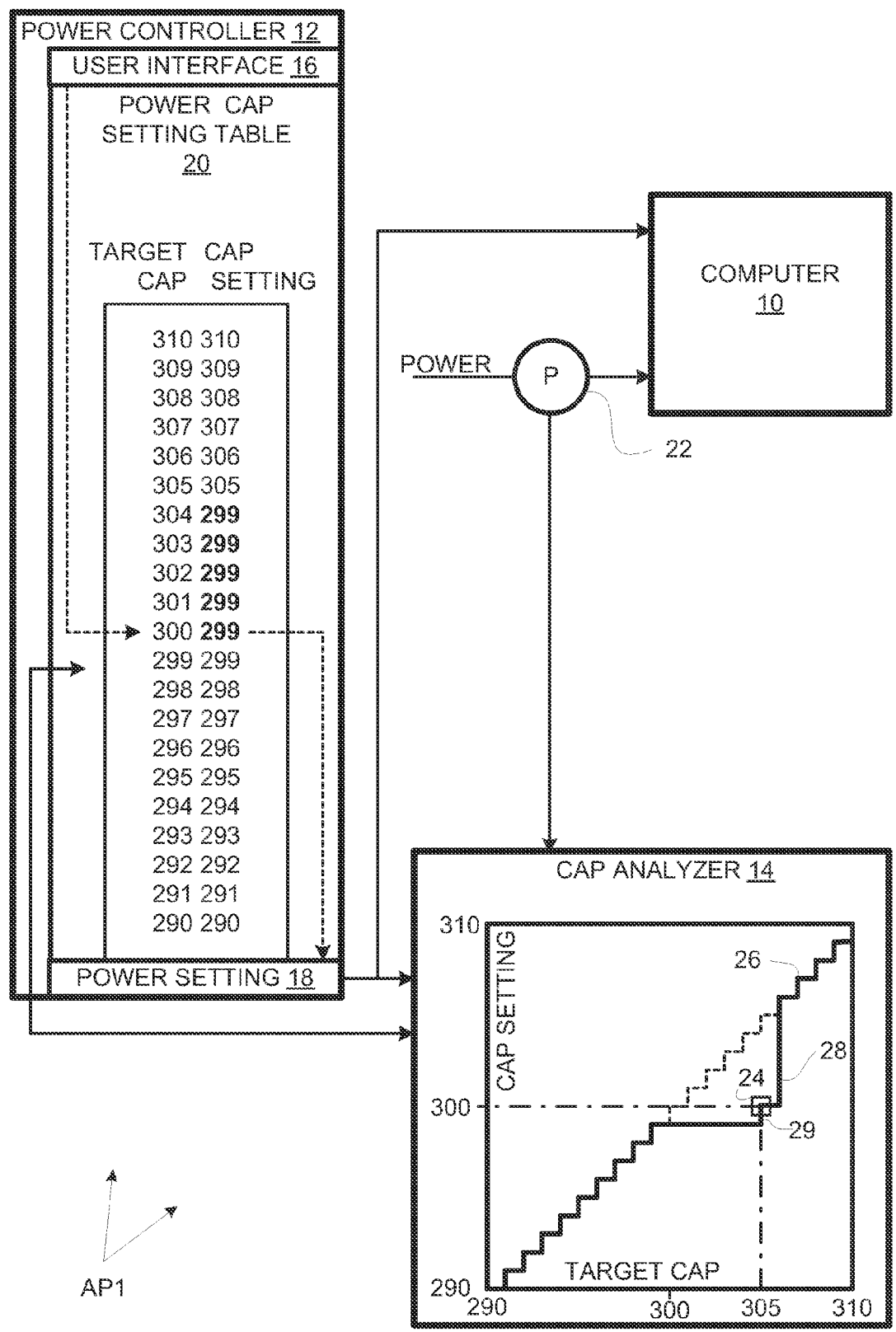
FIG. 1 is a schematic diagram of a system providing for adjustment of power-cap settings.
Figure 2:
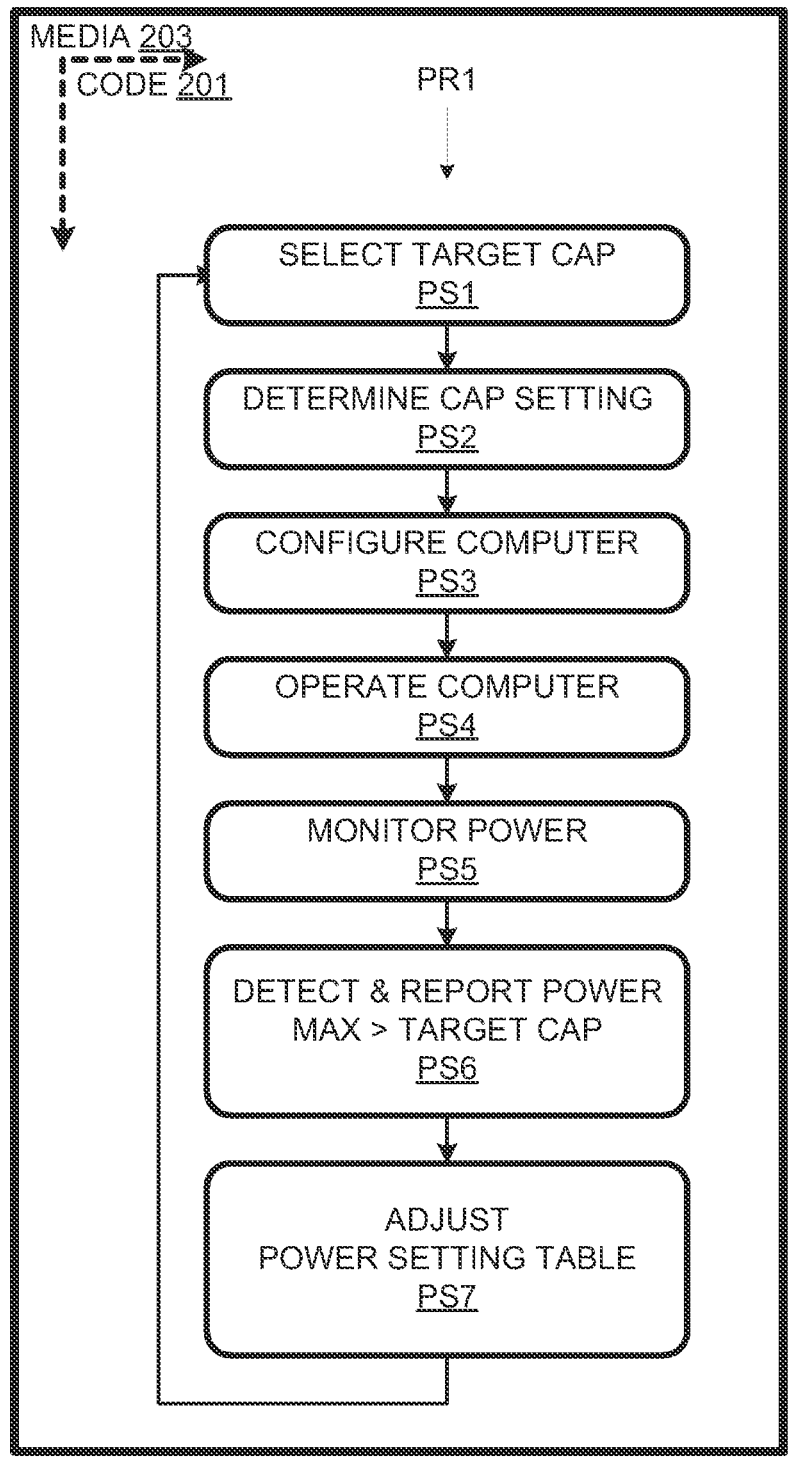
FIG. 2 is a flow chart of a method for adjusting power-cap settings.

A system AP1 provides for locally adjusting a power-consumption (power) cap setting table when power consumption exceeds a currently selected power cap. A power-cap setting for the currently selected cap is decremented in response to such an overage. In addition, power cap settings for target power caps between the selected power cap and the maximum power consumption can be set to the new value set for the currently selected power cap. Thus, the setting for multiple power caps can be adjusted at once. In contrast to the approach in which the minimum power cap setting is adjusted, this local approach allows power cap settings below the adjusted range to remain available.

Herein, a "power cap" is a desired power-consumption limit. A "power-cap setting" is a setting of a power-cap controller designed to achieve an associated power cap. By default, a power-cap setting may be set equal to the associated power cap. However, if a currently selected power cap is exceeded, the power cap setting for that power cap can be adjusted so that it is lower than the associated power cap and so that the associated power cap will be less likely to be exceeded in the future.

System AP1 includes a computer 10, a power controller 12, and a cap analyzer 14. For expository purposes, these elements are treated as separate entities. However, in practice, cap analyzer 14 can be a component of power controller 12. Also, the power controller can be a component of the managed computer or a component of a system for managing the managed computer. The managed computer can, for example, be a cell phone, a laptop computer, a desktop computer, a mainframe, a rack or blade system, or a virtual machine. Power cap settings can be made for one or more such computers concurrently, either as a block or individually, to maintain overall power consumption objectives.

The power consumption of the computer can be controlled by throttling some performance-related parameter such as processor clock speed or disabling some devices, e.g., memory modules. Note that some power conservation steps can engender further savings, e.g., reducing processor speed can reduce heat dissipation, reducing the power required to cool the computer.

Power controller 12 has a user interface 16 so that a system administrator or user can select a power-cap setting 18. User interface 16 also provides a program interface so that power-cap settings can be automated, e.g., in response to time of day or room temperature.

Power controller 12 has a power-cap settings table 20 which is used to indicate what the power-cap setting should be to attain a desired target power cap. By default, the power-cap setting equals the desired power level. For cases in which the setting equals the desired power level, the target cap and the corresponding power-cap setting are equal in table 20, e.g., as they are for a power cap setting of 290 (Watts). However, for some ranges in which the power cap level was exceeded by an actual power consumption level, the power-cap setting is lower than the target cap, e.g., for target cap 300, the power-cap setting is 299. For human users, the power-cap setting can be considered a recommended setting. For automated control, the power-cap setting is selected automatically in response to a selection of a target cap.

Whatever power cap is selected, computer 10 is set to a power vs. performance configuration for which the expected maximum power consumption will not exceed the selected power cap. As computer 10 is operated at the selected power vs. performance configuration, power consumption is monitored by power meter 22. The resulting readings are provided to cap analyzer 14.

Cap analyzer 14 compares maximum power consumption with the currently implemented power cap. If the maximum power consumption exceeds the currently selected target cap, analyzer 14 modifies power-cap setting table 20. The power-cap setting for the maximum power consumption is decreased to the power cap setting that was in effect when the maximum was observed. The power-cap setting corresponding to the currently selected target cap is decremented. By "decrement" is meant "decrease to the next lower available power setting". In addition, the power-cap settings for all target caps less than the observed maximum power consumption are set to this same value, unless the value in the table is already smaller.

Thus, if the currently selected target cap is 300 Watts and the resulting maximum, power consumption is 305 Watts, the corresponding power cap setting is decremented from 300 to 299 and the adjusted settings for target cap values 301 to 305 are decreased to 299, as shown in FIG. 1. Note that adjusted settings for target caps below the selected target cap and above the maximum power consumption are not changed.

The operation of cap analyzer 14 in this case can be characterized by the graph in FIG. 1, in which data point 24 represents a maximum power consumption of 305 that occurs while the target cap is set at 300. The default power-cap settings are represented by a diagonal stair-step (corresponding to the discrete character of the selectable target power caps and power cap settings line 26). After the modification by cap analyzer 14, a large step or notch 28 is cut in diagonal line 26. Large notch 28 itself includes a small notch 29 at its apex.

In system AP1, for the currently selected target cap, an excessive power consumption results in a decrement of 1 Watt in the corresponding power-cap setting. In general, the magnitude of the decrement will be less than the excess of the maximum power over the selected target power cap. Thus, even where the power-cap setting is less than the corresponding target cap, the target cap can still be surpassed by the actual power consumption. Thus, for example, if a power-cap setting of 299 is used for a target cap of 300, a maximum power consumption value in excess of 300 will cause the corresponding adjusted setting to be decremented from 299 to 298. Iterating this procedure should converge on a sufficiently low power-cap setting that will prevent a target cap from being exceeded.

For another example, starting with the power-cap setting table 20 with the values as shown in FIG. 1, if the target cap is 303 watts and a peak power of 306 is attained, another notch will be removed from the graph of FIG. 1. Since the ranges of the first and second notches overlap, the result will be an irregular stair-step shape. Gradually, the notches can define a new power cap curve that actually achieves the target power caps. Note that all changes reduce power-cap settings; in system AP1, the adjusted settings are not increased as a result of actual power consumption data. However, variations of system AP1 provide for such increases where the target power cap is not approached after an extended period of operation under demanding conditions.

The right-angled notch 28 produced in system AP1 corresponds to a general assumption of monotonicity, but assumes little regarding a magnitude of any correlation between the power cap and the power-cap setting. Alternative implementations can make an assumption of some degree of correlation, e.g., resulting in a obtuse triangular notch or a more Gaussian distribution about the maximum power-consumption data point.

System AP1 implements a process PR1, which in turn can be implemented at least in part in computer-executable code 201 encoded on computer-readable storage media 203. At process segment PS1, a user or program selects a target cap. At process segment PS2, the user selects a recommended power-cap adjusted for the selected target cap, or, in the automated context, the power-cap setting corresponding to the selected target cap is automatically selected. The selected power-cap setting is implemented at process segment PS3, e.g., by setting processor clock rates. At process segment PS4, the computer is operated; concurrently, at process segment PS5, power consumption by the computer is monitored. At process segment PS6, a maximum power consumption in excess of the target cap is detected. At process PS7, the power cap table is adjusted as described above.

In system AP1, target caps are available in 1-Watt increments and exceeded power caps result in 1-Watt decrements; to allow for some tolerance, the decrements are from 0.05 Watts to 1.5 Watts. In other systems, the increments and decrements can be larger, e.g., 5 or 10 Watts, or smaller, e.g., 0.5 Watts, and the increments may not equal the decrements. However, when a power maximum exceeds the target cap by more than two increment units, the power-cap settings for two or more consecutive target caps are set to the new adjusted setting. These and other variations are within the subject matter defined by the following claims.

What is claimed is:

1. A method comprising:
    selecting a first power-consumption cap as the currently selected power-consumption cap from a series of power-consumption caps;
    configuring a computer according to a power-cap setting associated with said currently selected power-consumption cap; and
    in the event a maximum power consumption of said computer exceeds said currently selected power-consumption cap, decrementing the power-cap setting corresponding to the currently selected power-consumption cap and decreasing power-cap settings corresponding to power caps between the currently selected power cap setting and said maximum power consumption.

2. A method as recited in claim 1 wherein said first power-cap setting is reduced by less than the difference between said maximum power consumption and said currently selected power-consumption cap.

3. A method as recited in claim 2 wherein all the power-cap settings that are adjusted in response to said maximum power consumption are adjusted to the level to which the power-cap setting corresponding to the currently selected power-consumption cap is decremented.

4. A method as recited in claim 1 wherein said power-consumption caps represent discrete levels, said first power-consumption cap being reduced from one of said discrete levels to the next lower discrete level regardless of the difference between said maximum power consumption and said first target power-consumption cap.

5. A method as recited in claim 4 wherein said discrete levels are 0.5-10 Watts apart.

6. A system comprising;
    a power controller that provides for selecting a first power-consumption cap as the currently selected power-consumption cap, said first power-consumption cap being selected from a series of power-consumption caps, said power controller providing, for each of said target power consumption caps, a respective power-cap setting for each of said power-consumption caps that is used to configure a computer; and
    a cap analyzer configured to determine from received power-consumption data when a maximum power consumption by said computer exceeds a currently-set power consumption cap, and to, in the event said maximum power consumption by said computer exceeds said currently set power-consumption cap, reduce power cap settings for said currently set power consumption cap and for other power-consumption caps exceeded by said maximum power consumption.

7. A system as recited in claim 6 wherein all the power-cap settings that are decreased in response to said maximum power consumption are reduced to the same level.

8. A system as recited in claim 7 wherein said same level is equal to the target power-consumption cap immediately below the currently selected power-consumption cap.

9. A system as recited in claim 7 wherein all the power-cap settings that are changed are associated with target power caps within a range extending from said currently selected target power cap and said maximum power consumption level by said computer while said currently selected target power cap is in effect.

10. A system as recited in claim 6 wherein the power-cap setting associated with said currently selected power consumption cap is reduced between 0.5 Watts to 1.5 Watts regardless of the difference between said maximum power consumption and said currently selected target power consumption level.

11. A computer product comprising non-transitory computer-readable storage media encoded with code providing for:
    selecting a currently selected power-consumption cap from a series of power-consumption caps;
    configuring a computer according to a power-cap setting associated with said currently selected power consumption cap so that said computer's expected maximum power consumption does not exceed said currently selected power-consumption cap; and in the event a maximum power consumption of said computer exceeds said currently selected power consumption cap, reducing cap settings for a range of currently selected power consumption caps, said range including said currently selected power-consumption cap and other power-consumption caps greater than said currently selected power consumption cap and less than said maximum power consumption.

12. A computer product as recited in claim 11 wherein the power-cap setting for said currently selected power-consumption cap is reduced by less than the difference between said maximum power consumption and said currently selected power-consumption cap.

13. A computer product as recited in claim 12 wherein all, power-cap settings that are reduced in response to said maximum power consumption are reduced to the level to which said first cap setting is reduced.

14. A computer product as recited in claim 11 wherein power-consumption caps represent discrete levels, the power-cap setting for said currently selected power-consumption cap being reduced from one of said discrete levels to the next lower discrete level regardless of the extent to which said maximum power consumption exceeds said first target power-consumption cap.

15. A computer product as recited in claim 14 wherein said discrete levels are 0.5-10 Watts apart.

\* \* \* \* \*

UNITED STATES PATENT AND TRADEMARK OFFICE
CERTIFICATE OF CORRECTION

| | | |
|---|---|---|
| PATENT NO. | : 8,713,297 B2 | Page 1 of 1 |
| APPLICATION NO. | : 13/258384 | |
| DATED | : April 29, 2014 | |
| INVENTOR(S) | : Clifford A. McCarthy | |

It is certified that error appears in the above-identified patent and that said Letters Patent is hereby corrected as shown below:

In the Claims

In column 4, line 22, in Claim 6, delete "comprising;" and insert -- comprising: --, therefor.

In column 5, line 14, in Claim 13, delete "all," and insert -- all --, therefor.

Signed and Sealed this
Twenty-sixth Day of August, 2014

Michelle K. Lee
*Deputy Director of the United States Patent and Trademark Office*